United States Patent [19]

Hisano et al.

[11] Patent Number: 5,534,361

[45] Date of Patent: Jul. 9, 1996

[54] FERROMAGNETIC METAL POWDER

[75] Inventors: Seiichi Hisano; Kazuhisa Saito; Satoshi Aizawa; Kazushi Sano; Kazuyuki Matsumoto; Kenji Murata, all of Tokyo, Japan

[73] Assignee: Dowa Mining Co., Ltd., Tokyo, Japan

[21] Appl. No.: 266,227

[22] Filed: Jun. 27, 1994

[30] Foreign Application Priority Data

Jul. 1, 1993  [JP]  Japan ................................. 5-186578

[51] Int. Cl.$^6$ .................................................... G11B 5/66
[52] U.S. Cl. .................................. 428/694 RE; 148/301; 148/306; 420/77; 420/83; 420/103; 428/694 BR; 428/694 BA
[58] Field of Search ............................... 148/306; 420/77, 420/83, 103; 428/694 RE, 694 BR, 694 BA

[56] References Cited

U.S. PATENT DOCUMENTS

| | | | |
|---|---|---|---|
| 1,838,831 | 12/1931 | Hochheim et al. | 148/306 |
| 2,864,734 | 12/1958 | Adams et al. | 148/306 |
| 4,133,676 | 1/1979 | Oshimura et al. | |
| 4,290,799 | 9/1981 | Schroeder et al. | |
| 4,447,264 | 5/1984 | Suzuki et al. | |
| 4,544,463 | 10/1985 | Pryor | 204/146 |
| 4,728,363 | 3/1988 | Crane et al. | |
| 4,929,275 | 5/1990 | Bogatin | 75/246 |
| 4,985,073 | 1/1991 | Naumann et al. | |
| 5,062,907 | 11/1991 | Buschow et al. | 148/301 |
| 5,192,375 | 3/1993 | Sawa et al. | 148/306 |

FOREIGN PATENT DOCUMENTS 0361698  4/1990  European Pat. Off. ............... 148/306

*Primary Examiner*—John Sheehan
*Attorney, Agent, or Firm*—Frishauf, Holtz, Goodman, Langer & Chick

[57] ABSTRACT

There is provided a metallic magnetic powder with which one can produce magnetic media for high-density recording that are improved in storage stability and magnetic characteristics.

The improved ferromagnetic metal powder contains no more than 0.05 wt % of an element of Group Ia of the periodic table. The powder may optionally contain 0.1–30 atm % of aluminum and/or 0.1–10 atm % of Y or any other rare earth element based on the total quantity of the metal elements present. In either of these cases, the residue of an element of Group IIa of the periodic table is preferably 0.1 wt % or less.

18 Claims, No Drawings

FERROMAGNETIC METAL POWDER

BACKGROUND OF THE INVENTION

The present invention relates to a ferromagnetic metal powder suitable as a constitutional material for the magnetic layer of magnetic recording media such as magnetic tapes and disks.

As a result of the increase in recording density, magnetic recording media such as magnetic tapes and disks for use in audio, video and computer technologies have become increasingly smaller in size and better in performance and the magnetic powders for such recording media are accordingly shifting from the conventional iron oxide systems to metallic magnetic powders having higher coercive force and saturation magnetization.

The metallic magnetic powders for use in high-density magnetic recording applications are based typically on iron but sometimes on metals such as Ni and Co.

The common industrial process for the manufacture of iron base magnetic powders starts with iron oxyhydroxide or iron oxide-based acicular particles and consists of having an anti-sintering agent such as Si, Al, Zr or Ca deposited or adsorbed on the needles and thereafter reducing them with heat.

When synthesizing iron oxyhydroxide- or iron oxide-based compounds on an industrial scale, compounds of elements of Group Ia of the periodic table such as NaOH, $Na_2CO_3$ and KOH have been used as neutralizing agents for the principal reasons of low price and ease in handling. This has eventually produced metallic magnetic powders in which elements of Group Ia of the periodic table such as Na and K more or less remain as incidental impurities on the surfaces of the particles.

This is also true with elements of Group IIa of the periodic table. As taught in Examined Japanese Patent Publication (kokoku) Sho 59-32882 and Unexamined Published Japanese Patent Application (kokai) Hei 2-107701, those elements are occasionally used as anti-sintering agents or the like, which eventually remain on the metallic magnetic powders produced.

SUMMARY OF THE INVENTION

The present invention has been accomplished under these circumstances and has as the principal object achieving further improvements in the quality of magnetic media for high-density recording by using ferromagnetic metal powders having better magnetic characteristics and dispersibility, as well as assuring higher storage stability for the magnetic layer.

According to the present invention, there is provided a ferromagnetic metal powder that contains no more than 0.05 wt % of an element of Group Ia of the periodic table. The powder may optionally contain 0.1–30 atm % of aluminum and/or 0.1–10 atm % of Y or any other rare earth element based on the total quantity of the metal elements present. In either of these cases, the residue of a soluble element of Group IIa of the periodic table is preferably reduced to 0.1 wt % or less.

DETAILED DESCRIPTION OF THE INVENTION

As noted hereinabove, metallic magnetic powders have elements of Group Ia of the periodic table (e.g. Li, Na and K) or those of Group IIa (e.g. Mg, Ca, Sr and Ba) deposited on the surfaces of particles. The present inventors have found that if soluble salts of these basic elements are present on the surfaces of particles, the dispersibility necessary for producing coated media is deteriorated and that, furthermore, the storage stability and weathering resistance of the media product are impaired. It should also be mentioned that elements of Group Ia of the periodic table tend to accelerate the sintering that may occur in the reduction process.

Since the metallic magnetic particles for use in recent versions of magnetic recording media have become increasingly finer in order to meet the requirement for higher recording density, they are even more prone to be sintered during reduction and, at the same time, their increased surface areas contribute to a greater tendency for elements of Groups Ia and IIa to be contained in increased amounts.

The present inventors have found that the residues of these elements on the surfaces of metallic magnetic particles cause the following results:

(A) the binding power of resins becomes weak to reduce the durability of tape;

(B) because of their soluble nature, the elements combine with chlorine in the resins to form chlorides during tape storage or alternatively they precipitate as hydroxides on the tape surface, whereby troubles such as increased dropouts occur to cause deterioration in the tape characteristics;

(C) because of insufficient protection against sintering, the magnetic particles are sintered between themselves and their acicularity is impaired to cause deterioration in Hc, SFD and orientation characteristics; and (D) due to the presence of these basic elements, fatty acids or the like that act as an lubricant will be adsorbed on the particles during tape production to increase the coefficient of friction of the resulting tape.

The present inventors have found that these problems can be solved completely if the content of elements of Group Ia of the periodic table which have heretofore been held incidental components is or has been reduced to 0.05 wt % or less. As for the anti-sintering agents, soluble elements of Group IIa may be replaced by aluminum and/or rare earth elements (including Y), which form oxides without becoming soluble. If a suitable anti-sintering agent is selected from among these elements and used in an appropriate amount, the problem of lower dispersibility and storage stability that would otherwise accompany the practice of reducing the size of magnetic particles can be avoided while achieving marked improvements in magnetic characteristics.

To insure that the presence of elements of Group Ia of the periodic table is no more than 0.05 wt %, it is necessary to remove these elements if their introduction is inevitable to the process of producing metallic magnetic powders. The removal of these elements can be performed advantageously by incorporating a thorough cleaning step into the production process, for example, a step for thorough cleaning of the iron oxyhydroxide powder, the iron oxide powder or the metallic magnetic powder which have been produced. As the production proceeds from iron oxyhydroxide through iron oxide to the final metallic magnetic powder, elements of Group Ia will segregate on the surfaces of particles and hence can be removed by cleaning. More efficient removal can be achieved by using warm water or a cleaning solution whose pH has been lowered by acid addition.

This cleaning approach for removing elements of Group Ia of the periodic table has the advantage that soluble elements of Group IIa of the periodic table can also be removed.

As well as using starting materials that are free from the elements of Group Ia and IIa of the periodic table, the performance of the removal step Just described above assures that the content of an element of Group Ia is or has been reduced to 0.05 wt % or less, preferably 0.01 wt % or less, and that the content of a soluble element of Group IIa is or has been reduced to 0.1 wt % or less, preferablly 0.01 wt % or less.

By meeting these content requirments, the aforementioned problems A–D with the production of metallic magnetic powders can be avoided. If the content of an element of Gruop Ia exceeds 0.05 wt %, the compatibility of the magnetic particles with the binder resin becomes so low that they cannot be effectively dispersed in magnetic tape or only weak coats are formed by application of magnetic paints. As a further problem, elements of Group Ia are soluble, so they will bleed out on the surface of the tape being stored, thereby forming crystalline compounds which cause troubles such as increasd dropouts to lower the storage stability of the tape. If the content of a soluble element of Gruop IIa exceeds 0.1 wt %, not only the compatibility of the magnetic particles with the binder resin but also the strength of applied magnetic coats becomes low. If the content of an element of Group IIa is extremely high, the storage stability of tape also deteriorates as in the case where elements of Group Ia are used excessively.

In the present invention, aluminum and/or a rare earth element may also be incorporated in an appropriate amount and this helps improve the dispersibility of metallic magnetic particles and contribute to further improvements in magnetic characteristics. Thus, in accordance with the invention, there is provided a ferromagnetic metal powder with improved dispersibility and magnetic characteristics that is substantially free from soluble and basic elements of Groups Ia and IIa of the periodic table and which contains aluminum and/or a rare earth element.

The elements of Group Ia of the periodic table contemplated by the invention include Li, Na, K, etc.; the elements of Group IIa of the periodic table include Mg, Ca, Sr, Ba, etc.; and the rare earth elements include Y, La, Ce, Pr, Nd, Sm, Tb, Dy, Gd, etc.

The metallic magnetic powder of the present invention can advantageously be produced by a method in which given amounts of a rare earth element and aluminum are added to iron oxyhydroxide or iron oxide and the mixture is reduced under heating. Suitable examples of a metallic compound powder that is based on the iron oxyhydroxide or iron oxide to be reduced include not only $\alpha$-FeOOH, $\gamma$-FeOOH, $\alpha$-Fe$_2$O$_3$, $\gamma$-Fe$_2$O$_3$, Fe$_3$O$_4$ and equivalents to intermediates therebetween, but also those which contain additional metallic components such as Ni, Co, Cr, Mn and Zn. The use of metallic compound powders having better acicularity is preferred.

Exemplary aluminum compounds that can be used to have aluminum incorporated in iron oxyhydroxide or iron oxide include not only water-soluble salts such as Al$_2$(SO$_4$)$_3$, Al(NO$_3$)$_3$ and AlCl$_3$, but also water-soluble aluminates such as NaAlO$_2$ (sodium aluminate). The surfaces of the particles of iron oxyhydroxide or iron oxide to be reduced can be doped with aluminum compounds by a method that comprises dissolving the aluminum compounds in an aqueous alkali solution, dispersing the particles of the iron oxyhydroxide or iron oxide of interest in the solution and thereafter neutralizing the solution by either blowing carbon dioxide gas or adding an acid. In this way, the surfaces of the particles of iron oxyhydroxide or iron oxide to be reduced can be doped with aluminum compounds as crystalline or amorphous Al$_2$O$_3 \cdot$nH$_2$O (hydrous aluminum oxide).

An alternative method comprises dissolving aluminum in the particles of the iron oxyhydroxide or iron oxide to be reduced. To form a solid solution of alumimun in $\alpha$-FeOOH or $\gamma$-FeOOH, the above-listed water-soluble Al salts or aluminates may be added to a reaction system in which an aqueous solution of a ferrous salt such as FeSO$_4$ or FeCl$_2$ is neutralized with a neutralizer such as NaOH, Na$_2$CO$_3$ or NH$_4$OH and thereafter oxidized with air or the like to produce $\alpha$-FeOOH or $\gamma$-FeOOH. To form a solid solutin of aluminum in $\alpha$-Fe$_2$O$_3$, the above-listed water-soluble Al salts or aluminates may be added to a reaction system in which an aqueous solution of a ferric salt such as Fe$_2$(SO$_4$)$_3$ or FeCl$_3$ is treated by a hydrothermal process using a neutralizer such as NaOH or KOH to synthesize $\alpha$-Fe$_2$O$_3$.

In a preferred case, the thus prepared Al-containing iron oxyhydroxide or iron oxide is heated at 250°–400° C. to have aluminum fixed as Al$_2$O$_3$ and then used as a feed into which a rare earth element is to be incorporated. It should be noted here that as a result of the dehydration reaction that occurs in the heating step, iron oxyhydroxide has been transformed to iron oxide. Rare earth elements can be incorporated by various methods such as one that comprises dispersing the particles of the feed in a liquid containing the rare earth element to be incorporated and adding an alkali to produce a hydroxide precipitate, as well as one that comprises dispersing the particles of the feed in a liquid containing a compound of the rare earth element to be incorporated and thereafter evaporating water.

The powder of the iron oxide into which given amounts of aluminum and the rare earth element have been incorprated by the various methods described above is reduced by heating in a reducing atmosphere to produce a metallic magnetic powder that is based on aluminum- and rare earth element-containing iron. The optimal conditons for thermal reduction vary with the kind of the iron oxyhydroxide or iron oxide to be reduced but typically it is performed at a temperature of 300°–700° C. in a hydrogen stream.

The process of production described above involves the stage of using a neutralizer such as NaOH, KOH, Na$_2$CO$_3$ or NH$_4$OH and, therefore, elements of Group Ia of the periodic table that originate from those neutralizers will remain in the metallic magnetic powder produced. As already mentioned herein, these residues of elements of Group Ia can advantageously be removed by performing a thorough cleaning treatment after every step of the manufacture of metallic magnetic particles.

The content of the rare earth element in the thus produced metallic magnetic powder is suitably in the range from 0.1 to 10 atm %, preferably from 0.2 to 5 atm %. Below 0.1 atm %, the incorporated rare earth element is not highly effective and sintering is prone to occur during thermal reduction. Beyond 10 atm %, an oxide of the rare earth element will form in such a great amount that the produced metallic magnetic powder has too small saturation magnetization to be suitable for use as a magnetic material.

The aluminum content is suitably in the range from 0.1 to 30 atm %, preferably from 1 to 20 atm %. Below 0.1 atm %, sintering is prone to occur during thermal reduction; beyond 30 atm %, the saturation magnetization of the product powder becomes undesirably small.

EXAMPLE 1

Fifty grams of $\alpha$-FeOOH particles (length of particle, 0.2 µm; aspect ratio, 15) containing 5% of Co based on Fe were heated at 400° C. for 3 hours to produce $\alpha$-Fe$_2$O$_3$, which was suspended in 5 liters of pure water, filetered, washed with pure water (60° C.) and dried.

A measured portion (10 g) of the thus prepared $\alpha$-$Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder.

The analytical data of this metallic magnetic powder, as well as its powder and magnetic characteristics were measured and the results are shown in Table 1, in which "BET" refers to the specific surface area as measured by the BET method, "X-ray particle size" means the particle size (in angstroms) as calculated from an X-ray diffraction peak for a (110) face of $\alpha$-Fe; "Hc", "$\sigma s$" and "$\sigma r/\sigma s$" designate the coercive force (Oe), saturation magnetization (emu/g) and squareness ratio, respectively, and $\Delta \sigma s$ signifies the percent drop of $\sigma s$ upon standing in a hot and humid atmosphere (60° C.×90% r.h.) for one week.

EXAMPLE 2

Aluminum sulfate [$Al_2(SO_4)_3$, 4.8 g] was dissolved in 5 liters of pure water and the pH of the solution was adjusted to 12.5 with an aqueous solution of 10% NaOH. Fifty grams of $\alpha$-FeOOH particles (length of particle, 0.2 µ m; aspect ratio, 15) containing 5% of Co based on Fe were suspended in the solution and stirred well to form a slurry. Carbon dioxide gas was blown into the slurry to neutralize it to a pH of 9 or less, whereby the surfaces of the $\alpha$-FeOOH particles were covered with hydrous aluminum oxide ($Al_2O_3 \cdot nH_2O$).

The $\alpha$-FeOOH particles thus doped with hydrous aluminum oxide were filtered, washed with water, dried and heated at 400° C. for 3 hours to effect transformation to $Al_2O_3$-doped $\alpha$-$Fe_2O_3$. The powder of $Al_2O_3$-doped $\alpha$-$Fe_2O_3$ was disintegrated into particles, which were suspended in pure water, refiltered and washed with water, thereby yielding $Al_2O_3$-doped $\alpha$-$Fe_2O_3$ that was substantially free form Na and elements of Group Ia of the periodic table.

The thus prepared Al-containing $\alpha$-$Fe_2O_3$ was reduced under heating as in Example 1 to produce a metallic magnetic powder. The analytical data of this powder, as well as its powder and magnetic characteristics are shown in Table 1.

EXAMPLE 3

The procedure of Example 1 was repeated to prepare $\alpha$-$Fe_2O_3$, which was suspended in a 1-L aqueous solution of lanthanum nitrate [$La(NO_3)_3$, 1.8 g]. Upon thorough agitation, a slurry formed, which was then charged into a dryer and heated at 100° C. to evaporate water, thereby producing La-doped $\alpha$-$Fe_2O_3$.

The thus produced La-containing $\alpha$-$Fe_2O_3$ was reduced with heating as in Example 1 to yield a metallic magnetic powder. The analytical data of the powder, as well as its powder and magnetic characteristics are shown in Table 1.

EXAMPLE 4

Aluminum sulfate [$Al_2(SO_4)_3$, 4.8 g] was dissolved in 5 liters of pure water and the pH of the solution was adjusted to 12.5 with an aqueous solution of 10% NaOH. Fifty grams of $\alpha$-FeOOH particles (length of particle, 0.2 µm; aspect ratio, 15) containing 5% of Co based on Fe were suspended in the solution and stirred well to form a slurry. Carbon dioxide gas was blown into the slurry to neutralize it to a pH of 9 or less, whereby the surfaces of the $\alpha$-FeOOH particles were covered with hydrous aluminum oxide ($Al_2O_3 \cdot nH_2O$).

The $\alpha$-FeOOH particles thus doped with hydrous aluminum oxide were filtered, washed with water, dried and heated at 400° C. for 3 hours to effect to transformation to $Al_2O_3$ -doped $\alpha$-$Fe_2O_3$. The powder of $Al_2O_3$-doped $\alpha$-$Fe_2O_3$ was disintegrated into particles, which were suspended in pure water, refiltered and washed with water, thereby yielding $Al_2O_3$-doped $\alpha$-$Fe_2O_3$ that was substantially free from Na and elements of Group Ia of the periodic table.

The thus prepared $Al_2O_3$-doped $\alpha$-$Fe_2O_3$ was suspended in a 1-L aqueous solution of lanthanum nitrate [$La(NO_3)_3$, 1.8 g]. Upon thorough agitation, a slurry formed, which was then charged into a dryer and heated at 100° C. to evaporate water, thereby producing $\alpha$-$Fe_2O_3$ which was doped with not only $Al_2O_3$ but also La.

A measured portion (10 g) of the thus prepared $Al_2O_3$- and La-containing $\alpha$-$Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder containing both Al and La. The analytical data of this metallic powder, as well as its powder and magnetic characteristics are shown in Table 1.

EXAMPLE 5

The metallic magnetic particles produced in Example 1 were suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 1.

EXAMPLE 6

The metallic magnetic particles produced in Example 2 were suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 1.

EXAMPLE 7

The procedure of Example 6 was repeated, except that the amount of aluminum sulfate [$Al_2(SO_4)_3$] dissolved in pure water was doubled, namely, 9.6 g of aluminum sulfate was dissolved rather than 4.8 g which was used in Example 2. The analytical data of the metallic magnetic powder produced, as well as its powder and magnetic characteristics are shown in Table 1.

EXAMPLE 8

The metallic magnetic particles produced in Example 3 were suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 1.

EXAMPLE 9

The procedure of Example 8 was repeated, except that the use of lanthanum nitrate was almost doubled, namely, the aqueous solution of 1.8 g of lanthanum nitrate [La(NO$_3$)$_3$] in 1 L of water in Example 3 was replaced by an aqueous solution of 3.7 g of lanthanum nitrate in 1 L of water. The analytical data of the metallic magnetic powder produced, as well as its powder and magnetic characteristics are shown in Table 1.

EXAMPLE 10

The metallic magnetic particles produced in Example 4 were suspended in CO$_2$-containing pure water, followed by filtration, washing with water and drying. A sequence of these steps were conducted in a nitrogen atmosphere. The analyticlal data of the metallic magnetic powder produced, as well as its powder and magnetic characteristics are shown in Table 1.

EXAMPLE 11

A metallic magnetic powder containing both Al and La was produced as in Example 4, except that the amount of aluminum sulfate [Al$_2$(SO$_4$)$_3$] to be dissolved in pure water was increased to 9.6 g and that an aqueous solution of 3.7 g of lanthanum nitrate was used. The magnetic particles thus prepared were suspended in CO$_2$-containing pure water, followed by filtration, washing with water and drying. A sequence of these steps were conducted in a nitrogen atmosphere. The analytical data of the metallic magnetic powder produced, as well as its powder and magnetic characteristics are shown in Table 1.

EXAMPLE 12

The procedure of Example 11 was repeated, except that the aqueous solution of 3.7 g of lanthanum nitrate was replaced by an aqueous solution of 3.9 g of terbium nitrate. The analytical data of the metallic magnetic powder produced, as well as its powder and magnetic characterisics are shown in Table 1.

EXAMPLE 13

The procedure of Example 11 was repeated, except that the aqueous solution of 3.7 g of lanthanum nitrate was replaced by an aqueous solution of 3.7 g of cerium nitrate. The analytical data of the metallic magnetic powder produced, as well as its powder and magnetic characterisics are shown in Table 1.

EXAMPLE 14

The procedure of Example 11 was repeated, except that the aqueous solution of 3.7 g of lanthanum nitrate was replaced by an aqueous solution of 3.7 g of neodymium nitrate. The analytical data of the metallic magnetic powder produced, as well as its powder and magnetic characterisics are shown in Table 1.

EXAMPLE 15

The procedure of Example 11 was repeated, except that the aqueous solution of 3.7 g of lanthanum nitrate was replaced by an aqueous solution of 3.1 g of yttrium nitrate. The analytical data of the metallic magnetic powder produced, as well as its powder and magnetic characterisics are shown in Table 1.

EXAMPLE 16

The procedure of Example 15 was repeated, except for the use of α-FeOOH particles having a length of 0.12 µm and an aspect ratio of 15. The analytical data of the metallic magnetic powder produced, as well as its powder and magnetic characteristics are shown in Table 1.

Comparative Example 1

The procedure of Example 1 was repeated, except that α-Fe$_2$O$_3$ as produced by heating at 400° C. for 3 hours was charged directly into the rotary furnace without being washed with pure water. The analytical data of the metallic magnetic powder produced, as well as its powder and magnetic characteristics are shown in Table 1.

Comparative Example 2

The procedure of Comparative Example 1 was repeated, except for the use of α-FeOOH particles having a length of 0.12 µm and an aspect ratio of 15. The analytical data of the metallic magnetic powder produced, as well as its powder and magnetic characteristics are shouwn in Table 1.

Comparative Example 3

The procedure of Example 4 was repeated, except that Al$_2$O$_3$-doped α-Fe$_2$O$_3$ as produced by heating at 400° C. for 3 hours was charged directly into the rotary furnace without being washed with pure water. The analytical data of the metallic magnetic powder produced, as well as its powder and magnetic characteristics are shown in Table 1.

Comparative Example 4

The procedure of Example 15 was repeated, except for the following three points: α-FeOOH particles having a length of 0.12 µm and an aspect ratio of 15 were used; the step of washing Al$_2$O$_3$-doped α-Fe$_2$O$_3$ was omitted; the final step of washing the magnetic powder with CO$_2$-containing pure water was omitted. The analytical data of the metallic magnetic powder produced, as well as its powder and magnetic characteristics are shown in Table 1.

The metallic magnetic powders produced in Examples 1–16 and Comparative Examples 1–4 were formulated into paints under the same conditions and applied to resin films under the same conditions to prepare magnetic tape samples. The characteristics of those tape samples are shown in Table 2, in which "roughness" refers to values of measurement (in angstroms) with a surface roughness meter, "gloss" refers to the degree of gloss as measured with a gloss meter, "Br" singnifies residual flux density (in gauss), "Bm" means saturation flux density (in gauss), "Br/Bm" signifies squareness ratio, "SFD" means coercive force distribution, "ΔBm" designates the percent drop of Bm upon standing in a hot and humid atmosphere (60° C.×90% r.h.) for one week, "precipitation after weathering test" describes the result of microscopic examination of the tape surface after standing in a hot and humid atmosphere (60° C.×90% r.h.) for one week, and "output" refers to values of measurement on a Hi8 deck.

TABLE 1

The Characteristics of Magnetic Powder

| | | Analytical data | | | | Powder characteristics | | | | | | | | |
|---|---|---|---|---|---|---|---|---|---|---|---|---|---|---|
| | | RE element | | | | Length of particle | | | X-ray particle size | pH of powder | Adsorption of stearic acid | Magnetic characteristic | | |
| Fe-5Co | Al atm % | name | atm % | sol. Na wt % | Ca wt % | μm | Aspect ratio | BET m²/g | Å[1] | der | mg/g | Hc | σs | σr/σs | Δσs[2] |
| Example | | | | | | | | | | | | | | | |
| 1 | — | — | — | 0.006 | 0.12 | 0.10 | 7 | 51 | 180 | 10.3 | 96 | 1005 | 142 | .40 | 12.1 |
| 2 | 5.0 | — | — | 0.006 | 0.12 | 0.11 | 8 | 53 | 170 | 10.1 | 100 | 1425 | 135 | .46 | 9.6 |
| 3 | — | La | 1.0 | 0.006 | 0.12 | 0.11 | 9 | 54 | 175 | 10.2 | 103 | 1320 | 137 | .46 | 10.2 |
| 4 | 5.0 | La | 1.0 | 0.006 | 0.12 | 0.12 | 11 | 57 | 165 | 10.1 | 108 | 1760 | 132 | .50 | 9.5 |
| 5 | — | — | — | Trace | 0.005 | 0.10 | 7 | 50 | 180 | 9.4 | 85 | 1000 | 143 | .41 | 11.8 |
| 6 | 5.0 | — | — | Trace | 0.005 | 0.11 | 8 | 52 | 170 | 9.6 | 88 | 1430 | 136 | .46 | 9.1 |
| 7 | 10.0 | — | — | Trace | 0.005 | 0.12 | 9 | 56 | 165 | 9.5 | 94 | 1470 | 133 | .47 | 8.9 |
| 8 | — | La | 1.0 | Trace | 0.005 | 0.11 | 9 | 53 | 175 | 9.5 | 89 | 1330 | 137 | .46 | 10.0 |
| 9 | — | La | 2.0 | Trace | 0.005 | 0.12 | 10 | 56 | 170 | 9.5 | 97 | 1350 | 134 | .47 | 8.9 |
| 10 | 5.0 | La | 1.0 | Trace | 0.005 | 0.13 | 11 | 57 | 165 | 9.6 | 97 | 1770 | 131 | .50 | 8.2 |
| 11 | 10.0 | La | 2.0 | Trace | 0.005 | 0.13 | 12 | 58 | 160 | 9.4 | 99 | 1810 | 128 | .51 | 7.9 |
| 12 | 10.0 | Tb | 2.0 | Trace | 0.005 | 0.13 | 12 | 58 | 160 | 9.5 | 97 | 1832 | 128 | .51 | 7.7 |
| 13 | 10.0 | Ce | 2.0 | Trace | 0.005 | 0.13 | 12 | 61 | 155 | 9.5 | 104 | 1805 | 128 | .51 | 8.0 |
| 14 | 10.0 | Nd | 2.0 | Trace | 0.005 | 0.13 | 12 | 59 | 160 | 9.6 | 100 | 1800 | 128 | .51 | 8.0 |
| 15 | 10.0 | Y | 2.0 | Trace | 0.005 | 0.13 | 12 | 58 | 160 | 9.5 | 99 | 1815 | 128 | .51 | 7.8 |
| 16 | 10.0 | Y | 2.0 | Trace | 0.005 | 0.08 | 12 | 64 | 150 | 9.4 | 102 | 1840 | 126 | .51 | 8.5 |
| Comparative Example | | | | | | | | | | | | | | | |
| 1 | — | — | — | 0.13 | 0.12 | 0.10 | 6 | 50 | 180 | 10.9 | 104 | 995 | 143 | .40 | 12.1 |
| 2 | — | — | — | 0.13 | 0.12 | 0.07 | 6 | 54 | 180 | 11.0 | 108 | 975 | 140 | .38 | 14.1 |
| 3 | 5.0 | | 1.0 | 0.13 | 0.12 | 0.11 | 11 | 57 | 170 | 11.1 | 114 | 1745 | 133 | .48 | 13.2 |
| 4 | 10.0 | | 2.0 | 0.16 | 0.12 | 0.08 | 11 | 63 | 155 | 10.9 | 120 | 1805 | 127 | .48 | 14.5 |

[1] Calculated from X-ray diffraction peak for (110) face of α-Fe.
[2] Percent drop of σs upon 1-wk standing at 60° C. × 90% r.h.

TABLE 2

Tape Characteristics

| | Roughness Å | Gloss | Hc Oe | Bm G | Br/Bm | SFD | ΔBm %[1] | Output dB[2] | C/N dB | Precipitation after weathering test[3] |
|---|---|---|---|---|---|---|---|---|---|---|
| Example | | | | | | | | | | |
| 1 | 97 | 161 | 1010 | 3080 | 0.65 | 0.96 | 4.1 | −3.9 | −4.7 | absent |
| 2 | 93 | 172 | 1420 | 2880 | 0.72 | 0.79 | 3.2 | −0.8 | −1.0 | " |
| 3 | 92 | 173 | 1340 | 2940 | 0.71 | 0.79 | 3.4 | −1.3 | −1.4 | " |
| 4 | 85 | 181 | 1770 | 2760 | 0.76 | 0.62 | 3.8 | +0.9 | +0.7 | " |
| 5 | 93 | 177 | 1030 | 3220 | 0.69 | 0.94 | 3.9 | −3.3 | −3.6 | " |
| 6 | 89 | 175 | 1440 | 2990 | 0.75 | 0.76 | 3.0 | −0.4 | −0.6 | " |
| 7 | 87 | 179 | 1500 | 2950 | 0.77 | 0.74 | 3.0 | −0.3 | −0.5 | " |
| 8 | 88 | 179 | 1360 | 3050 | 0.76 | 0.76 | 3.5 | −0.8 | −0.5 | " |
| 9 | 85 | 181 | 1380 | 2960 | 0.78 | 0.75 | 3.0 | −0.6 | −0.7 | " |
| 10 | 80 | 186 | 1805 | 2900 | 0.81 | 0.58 | 2.8 | +1.4 | +3.1 | " |
| 11 | 79 | 188 | 1845 | 2870 | 0.84 | 0.52 | 2.8 | +1.9 | +1.8 | " |
| 12 | 78 | 189 | 1865 | 2860 | 0.83 | 0.51 | 2.7 | +2.1 | +1.9 | " |
| 13 | 79 | 187 | 1845 | 2865 | 0.84 | 0.53 | 2.8 | +1.7 | +1.6 | " |
| 14 | 79 | 188 | 1835 | 2860 | 0.84 | 0.52 | 2.8 | +1.8 | +1.7 | " |
| 15 | 77 | 190 | 1850 | 2870 | 0.84 | 0.51 | 2.6 | +2.0 | +1.9 | " |
| 16 | 75 | 191 | 1875 | 2840 | 0.83 | 0.55 | 2.9 | +2.4 | +2.5 | " |
| Comparative Example | | | | | | | | | | |
| 1 | 107 | 150 | 1005 | 2890 | 0.61 | 1.01 | 4.1 | * | | present |
| 2 | Poor dispersibility made tape production impossible. | | | | | | | | | |

TABLE 2-continued

| | | | | Tape Characteristics | | | | | |
|---|---|---|---|---|---|---|---|---|---|
| | Roughness Å | Gloss | Hc Oe | Bm G | Br/Bm | SFD | ΔBm %[1] | Output dB[2] | C/N dB | Precipitation after weathering test[3] |
| 3 | 99 | 159 | 1760 | 2550 | 0.70 | 0.70 | 4.4 | +0.3 | +0.2 | present |
| 4 | 93 | 169 | 1820 | 2460 | 0.71 | 0.71 | 4.8 | +0.1 | -0.0 | present |

*The tape durability was too low to warrant measurements.
[1] Percent drop fo Bm upon 1-wk standing at 60° C. × 90% r.h.
[2] Output measurements were conducted with a Hi8 deck.
[3] After 1-wk standing at 60° C. × 90% r.h., the tape surface was microscopically examined for the precipitation of crystals.

The data in Tables 1 and 2 show the following.

(1) When no treatment was conducted to remove Na or Ca, the dispersibility of magnetic particles was extremely low (Comparative Example 2) and even when dispersion was possible, the product tape had very low weather resistance (Compartive Example 1); in addition, all comparative samples were poor in storage stability since crystals precipitated on the tape surface upon standing in a hot and humid atmosphere (60° C.×90% r.h.) for one week. In contrast, the samples of Examples 1–16 which had been subjected to the treatment for the removal of Na and Ca featured good dispersibility of magnetic particles and exhibited excellent tape durability and storage stability.

(2) As is clear from the comparison between Examples 1 and 2 or between Examples 5 and 6 (or 7), the combination of the step for Na and Ca removal with the addition of aluminum contributed to improvements in the magnetic characteristics of magnetic powder (as evidenced by higher Hc and σr/σs and lower Δσs) and, as regards the tape characteristics, the squareness ratio, SFD, ΔBm, etc. were improved accompanying those improvements in magnetic characteristics.

(3) As is clear from the comparison between Examples 1 and 3 or between Examples 5 and 8 (or 9), the combination of the step for Na and Ca removal with the addition of a rare earth element contributed to improvements in the magnetic characteristics of magnetic powder (as evidenced by higher Hc and σr/σs and lower Δσs) and, as regards the tape characteristics, the squareness ratio, SFD, ΔBm, etc. were improved accompanying those improvements in magnetic characteristics.

(4) The combination of the step for Na and Ca removal with the addition of both aluminum and a rare earth element contibuted to further improvements in the magnetic characteristics of magnetic powder (as evidenced by higher Hc and σr/σs and lower Δσs) and, as regards the tape characteristics, the squareness ratio, SFD, ΔBm, etc. were much more improved accompanying those further improvements in magnetic characteristics; thus, the improvements in the magnetic and tape characterisitics of the relevant samples were remarkable. This feature, combined with improved dispersibilitly and storage stability, made the samples ideal metallic magnetic powders.

(5) The improvements described above were marked with finer particles as is clear from the comparison between Examples 15 and 16.

Advantages of the Invention

As described on the foregoing pages, the metallic magnetic powder of the invention is substantially free from the elements of Group Ia of the periodic table and, hence, has good compatibility with the binder resin and assures high dispersibility and tape endurance. As a result, magnetic media for high-density recordig that have good storage stability can be produced using this metallic magnetic powder.

If both a rare earth element and aluminum are incorporated additionally, they interact with each other to exhibit a high anti-sintering effect, thereby helping provide metallic magnetic powders of high magnetic anisotropy which are improved in the acicularity and dispersibility of the particles.

What is claimed is:

1. Acicular ferromagnetic metal particles consisting essentially of iron, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

2. Acicular ferromagnetic metal particles consisting essentially of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

3. Acicular ferromagnetic metal particles having a coercivity of not less than 1600 Oe which consists essentially of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

4. Acicular ferromagnetic metal particles having an X-ray particle size of not greater than 170 Å which consists essentially of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

5. Acicular ferromagnetic metal particles having a σr to σs ratio (σr/σs) of not less than 0.47 which consists essentially of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

6. Acicular ferromagnetic metal particles according to any one of claims 1, 2, 3, 4 and 5 having a content of 0.1 wt % or less of a soluble element of Group IIa of the periodic table contained as an incidental component, said element of Group IIa being selected from the group consisting of magnesium, calcium, strontium and barium.

7. An improved magnetic recording media comprising a substrate supporting a layer of ferromagnetic metal particles fixed on said substrate, said ferromagnetic metal particles consisting essentially of acicular ferromagnetic iron particles, the improvement comprising said acicular ferromagnetic iron particles being the acicular ferromagnetic metal particles according to any one of claims 1, 2, 3, 4 and 5.

8. An improved magnetic recording media comprising a substrate supporting a layer of ferromagnetic metal particles fixed on said substrate, said ferromagnetic metal particles consisting essentially of acicular ferromagnetic iron particles, the improvement comprising said acicular ferromagnetic iron particles being the acicular ferromagnetic metal particles according to claim 6.

9. Acicular ferromagnetic metal particles according to any one of claims 2, 3, 4 and 5, said particles having contained therein 1–20 atm %, based on the total quantity of the metal elements present of aluminum.

10. Acicular ferromagnetic metal particles according to any one of claims 1, 2, 3, 4 and 5, said particles having contained therein 0.2–5 atm % based on the total quantity of the metal elements present of yttrium or any other rare earth element.

11. Acicular ferromagnetic metal particles according to claim 9, said particles having contained therein 0.1 wt % or less of a soluble element of Group IIa of the periodic table as an incidental component, said element of Group IIa being selected from the group consisting of magnesium, calcium, strontium and barium.

12. Acicular ferromagnetic metal particles according to claim 10, said particles having contained therein 0.1 wt % or less of a soluble element of Group IIa of the periodic table as an incidental component, said element of Group IIa being selected from the group consisting of magnesium, calcium, strontium and barium.

13. An improved magnetic recording media comprising a substrate supporting a layer of ferromagnetic metal particles fixed on said substrate, said ferromagnetic metal particles consisting essentially of acicular ferromagnetic iron particles, the improvement comprising said acicular ferromagnetic iron particles being the acicular ferromagnetic metal particles according to claim 9.

14. An improved magnetic recording media comprising a substrate supporting a layer of ferromagnetic metal particles fixed on said substrate, said ferromagnetic metal particles consisting essentially of acicular ferromagnetic iron particles, the improvement comprising said acicular ferromagnetic iron particles being the acicular ferromagnetic metal particles according to claim 10.

15. An improved magnetic recording media according to claim 13, said acicular ferromagnetic iron particles having contained therein as an incidental component 0.1 wt % or less of a soluble element of Group IIa of the periodic table, said element of Group IIa being seleced from the group consisting of magnesium, calcium, strontium and barium.

16. An improved magnetic recording media according to claim 14, said acicular ferromagnetic iron particles having contained therein as an incidental component 0.1 wt % or less of a soluble element of Group IIa of the periodic table, said element of Group IIa being seleced from the group consisting of magnesium, calcium, strontium and barium.

17. An improved magnetic recording media comprising a substrate supporting a layer of ferromagnetic metal particles fixed on said substrate, said ferromagnetic metal particles consisting essentially of acicular ferromagnetic iron particles, the improvement comprising said acicular ferromagnetic iron particles being the acicular ferromagnetic metal particles consisting essentially of iron, 1–20 atm % based on the total quantity of the metal elements present of aluminum, 0.2–5 atm % based on the total quantity of the metal elements present of yttrium, 0.05 wt % or less of an element of Group Ia of the periodic table contained as an incidental component, said element of Group Ia being selected from the group consisting of lithium, sodium and potassium, and 0.1 wt % or less of a soluble element of Group IIa of the periodic table contained as an incidental component, said element of Group IIa being selected from the group consisting of magnesium, calcium, strontium, and barium.

18. Acicular ferromagnetic metal particles consisting essentially of iron, 1–20 atm % based on the total quantity of the metal elements present of aluminum, 0.2–5 atm % based on the total quantity of the metal elements present of yttrium, 0.05 wt % or less of an element of Group Ia of the periodic table contained as an incidental component, said element of Group Ia being selected from the group consisting of lithium, sodium and potassium, and 0.1 wt % or less of a soluble element of Group IIa of the periodic table contained as an incidental component, said element of Group IIa being selected from the group consisting of magnesium, calcium, strontium, and barium.

* * * * *